(12) United States Patent
Chou

(10) Patent No.: US 8,045,502 B2
(45) Date of Patent: Oct. 25, 2011

(54) METHOD OF RESERVING RESOURCES WITH A MAXIMUM DELAY GUARANTEE FOR MULTI-HOP TRANSMISSION IN A DISTRIBUTED ACCESS WIRELESS COMMUNICATIONS NETWORK

(75) Inventor: Chun-Ting Chou, Briarcliff Manor, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 578 days.

(21) Appl. No.: 12/298,802

(22) PCT Filed: Apr. 30, 2007

(86) PCT No.: PCT/IB2007/051601
§ 371 (c)(1),
(2), (4) Date: Oct. 28, 2008

(87) PCT Pub. No.: WO2007/125513
PCT Pub. Date: Nov. 8, 2007

(65) Prior Publication Data
US 2009/0092105 A1    Apr. 9, 2009

Related U.S. Application Data

(60) Provisional application No. 60/796,983, filed on May 1, 2006.

(51) Int. Cl.
*H04B 7/212* (2006.01)
*H04J 3/00* (2006.01)
(52) U.S. Cl. ........................................ 370/322; 370/337
(58) Field of Classification Search .................. 370/229, 370/230, 231, 310, 315, 316, 319, 321, 322, 370/431, 458; 455/7
See application file for complete search history.

(56) References Cited

U.S. PATENT DOCUMENTS 7,330,694 B2 *   2/2008   Lee et al. .......................... 455/7
(Continued)

FOREIGN PATENT DOCUMENTS

WO   WO2005076543 A1   8/2005

OTHER PUBLICATIONS

Chunhung R. Lin et al., "OoS Routing in Ad HOC Wireless Networks", IEEE Journal on Selected Areas in Communications, IEEE Service Center, Piscataway, US, vol. 17, No. 8, Aug. 1999, pp. 1426-1438, XP011055000.

(Continued)

*Primary Examiner* — Chi Pham
*Assistant Examiner* — Robert Lopata
(74) *Attorney, Agent, or Firm* — Larry Liberchuk

(57) ABSTRACT

In a communication network (100), a method (400) of reserving X slots (610) for transmitting data from a source device (110A) to a destination device (110D) via multi-hop relay includes sending a first hop reservation request from the source device (110A) to a second device (110), for transmitting data from the source device to the destination device. The first hop reservation request identifies the source device, the destination device, and X proposed slots (610) to be reserved for the first hop. The source device then receives a first message, addressed to the source device from the second device, indicating that the first hop reservation request is pending and that the X slots proposed by the source device have been reserved by the second device. Later, the source device receives a subsequent message indicating whether a final hop reservation request has been accepted by the destination device.

19 Claims, 5 Drawing Sheets

U.S. PATENT DOCUMENTS

| | | | |
|---|---|---|---|
| 7,564,842 B2 * | 7/2009 | Callaway et al. | 370/389 |
| 7,693,060 B2 * | 4/2010 | Polk et al. | 370/231 |
| 7,719,972 B2 * | 5/2010 | Yuan et al. | 370/230 |
| 7,916,683 B2 * | 3/2011 | Kwon et al. | 370/322 |
| 7,929,546 B2 * | 4/2011 | Joshi et al. | 370/395.4 |
| 7,961,710 B2 * | 6/2011 | Lee et al. | 370/351 |
| 2005/0094657 A1 * | 5/2005 | Sung et al. | 370/431 |
| 2005/0237965 A1 | 10/2005 | Kuperschmidt | |
| 2007/0104215 A1 * | 5/2007 | Wang et al. | 370/458 |
| 2007/0195713 A1 * | 8/2007 | Khan et al. | 370/254 |

OTHER PUBLICATIONS

Lou Berger LABN Consulting et al., "RSVP Refresh Overhead Reduction Extensions", IETF Standard-Working-Draft, Internet Engineering Task Force, IETF, CH, vol. rsvp, No. 5, Jun. 2000, XP015027002 draft-ietf-rsvp-refresh-reduct-05.txt.

"High Rate Ultra Wideband PHY and MAC Standard", Standard ECMA, Dec. 2005, pp. 1,152-212, XP002460171 http://www.ecma-international.org/publications/files/ECMA-ST/ECMA-368.pdf.

* cited by examiner

| OCTETS: 1 | 1 | 2 | 2 | 2 | 2 | 4 | ... | 4 |
|---|---|---|---|---|---|---|---|---|
| ELEMENT ID | LENGTH | DRP CONTROL | TARGET/ OWNER DevAddr | SOURCE DevAddr | DESTINATION DevAddr | DRP ALLOCATION 1 | ... | DRP ALLOCATION N |

US 8,045,502 B2

METHOD OF RESERVING RESOURCES WITH A MAXIMUM DELAY GUARANTEE FOR MULTI-HOP TRANSMISSION IN A DISTRIBUTED ACCESS WIRELESS COMMUNICATIONS NETWORK

TECHNICAL FIELD

This invention pertains to the field of wireless communication networks, and more particularly to a method for reserving resources for multi-hop communication between a source device and a destination device in a distributed access wireless communications network.

BACKGROUND AND SUMMARY

There continues to be a proliferation of wireless communications networks. For example, the FCC has proposed to allow unlicensed radio transmitters to operate within the broadcast television spectrum at locations where one or more of the allocated terrestrial television channels are not being used, so long as such unlicensed transmitters include safeguards that insure no interference with the reception of licensed terrestrial television signals. Various organizations developed ultrawideband (UWB) wireless communication technologies to take advantage of permitted unlicensed wireless device operations in licensed frequency bands.

In particular, the WIMEDIA® Alliance has developed specifications for wireless networks based upon UWB technology. For example, the WIMEDIA® MAC specification provides a fully distributed medium access control (MAC) protocol to support high-speed single-hop transmission between devices that are located in the vicinity of each other, e.g., so-called personal area networks (PANs). Meanwhile, in December 2005, the European Computer Manufacturer's Association (ECMA) published ECMA-368: "High Rate Ultra Wideband PHY and MAC Standard" specifying an ultra wideband physical layer (PHY) and distributed MAC sublayer for a high-speed, short range, distributed access wireless network that may include portable and fixed devices.

As used herein, a device in a wireless network may also be referred to as a terminal or a node. Also as used herein, a wireless network is said to have "distributed access" when there is no central controller, base station, master station, etc. that governs or controls access to the communication resources (e.g., time slots in a reservation-based data transfer protocol) of the wireless network by the other devices in the network.

However, due to the regulatory restriction on transmission power, the transmission range of devices using the current WIMEDIA® MAC is limited, and decreases with any increase of the physical transmission rate. Accordingly, due to transmission range limitations, in some cases it is not possible for one device in a wireless personal area network (PAN) to transmit data to another device in the same network if the two devices are physically separated by too great of a distance. In other cases, where the two devices may be closer together, transmission may be possible, but only at reduced data rates. However, there are a number of applications where it would be highly desirable for devices that are remotely located from each other by a significant distance to be able to send and receive data to and from each other at higher data rates than are supported by the transmission power limitations on the devices.

Accordingly, it would be desirable to provide a method of transmitting data from one device to another device in a distributed wireless network even if the two devices are physically separated by too great of a distance for direct wireless transmission. It would also be desirable to provide such a method that supports high data transmission rates and spectrum efficiency. It would further be desirable to provide a method of reserving resources for multi-hop transmission from device to device in a distributed access wireless communications network.

In one aspect of the invention, in a communication network comprising a plurality of devices communicating using a reservation-based data transfer protocol having a superframe comprising a plurality of slots, a method of reserving X slots for transmitting data from a source device to a destination device via multi-hop relay is provided. The method includes sending a first hop reservation request from the source device, addressed to a second device different from the destination device, for transmitting data from the source device to the destination device. The first hop reservation request identifies the source device, the destination device, and X proposed slots to be reserved for a first hop between the source device and the second device. The method also includes, at the source device, receiving a first message, addressed to the source device from the second device, indicating that the first hop reservation request is pending and that the X slots proposed by the source device have been reserved by the second device. The method further includes, at the source device, receiving a subsequent message, addressed to the source device from the second device, indicating that a final hop reservation request has been accepted by the destination device, corresponding to the first hop reservation request of the source device.

In another aspect of the invention, in a communication network comprising a plurality of devices communicating using a reservation-based data transfer protocol having a superframe comprising a plurality of slots, a method of reserving slots for transmitting data from a source device to a destination device via multi-hop relay is provided. The method includes receiving at an Nth device an (N−1)th hop reservation request for transmitting data from a source device to a destination device via multi-hop relay. The reservation request identifies the source device, the destination device, and X proposed slots to be reserved for an (N−1)th hop between an (N−1)th device and the Nth device. The method includes, when the X proposed slots to be reserved for the (N−1)th hop are available at the Nth device: transmitting a message from the Nth device, addressed to the (N−1)th device, indicating that the reservation request is pending and that the X slots proposed by the (N−1)th device have been reserved by the Nth device; and sending an Nth hop reservation request from the Nth device, addressed to an (N+1)th device, for transmitting the data from the source device to the destination device, the Nth hop reservation request identifying the source device, the destination device, and X proposed slots to be reserved for an Nth hop between the Nth device and the (N+1)th device, wherein the X slots proposed by the Nth device to be reserved for the Nth hop are different from the X slots proposed by an (N−1)th device to be reserved for the (N−1)th hop. The method also includes, when the X proposed slots to be reserved for the (N−1)th hop are not available at the Nth device, transmitting a message from the Nth device, addressed to the (N−1)th device, indicating that the reservation request is denied.

DETAILED DESCRIPTION

While various principles and features of the methods and systems described below can be applied to a variety of communication systems, for illustration purposes the exemplary embodiments below will be described in the context of unlicensed wireless communication networks operating with reservation-based distributed access protocols.

More particularly, the exemplary embodiments described below pertain to a WIMEDIA® personal area network. However, the methods and techniques described below could also be applied in the case of other distributed access networks using reservation-based protocols, and even through a wired backbone. Of course, the scope of the invention is defined by the claims appended hereto, and is not limited by the particular embodiments described below.

With this in mind, we now describe methods by which devices that are remotely located from each other in a distributed access wireless personal area network (PAN) are able to send and receive data to and from each other at data rates that are not limited by the combination of transmission power and distance between the two devices.

As described below, in order to increase the transmission range while still maintaining spectrum efficiency (i.e., using a higher transmission rate), a mesh-enabled medium access control (MAC) protocol is provided. The mesh WIMEDIA® personal area network (PAN) is essentially a multi-hop, distributed PAN with some devices that relay/forward frames (packets) of data for their neighbors.

Figures 1, 2:
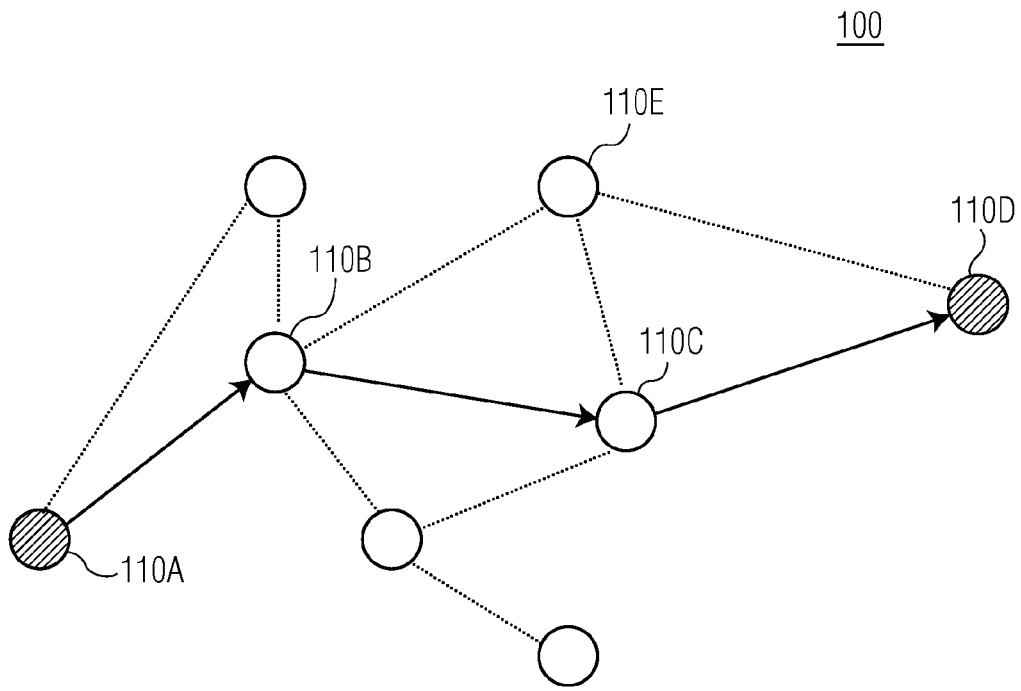
FIG. 1 graphically illustrates a wireless communication network.
FIG. 2 shows one embodiment of a Mesh DRP information element (IE)

For example, FIG. 1 graphically illustrates a wireless communication network 100 including a plurality of devices 110. In this case, mesh-enable devices 110B and 110C may relay a frame originated from source device 110A to its destination device 110D, which is unreachable by device 110A via a single-hop transmission.

Two important mechanisms, namely route/path discovery and multi-hop medium time reservation, are needed to implement a mesh PAN. Route/path discovery is not the subject the scope of this disclosure, and throughout the description to follow it is assumed that an optimal route based on the source device's desired metrics has already been determined.

The description to follow focuses instead on multi-hop medium time reservation. As the Distributed Reservation Protocol (DRP) in the current WIMEDIA® MAC specification enables a reservation-based transmission for delay-sensitive application, beneficially a similar mechanism should also be provided in a multi hop environment. This requires that devices along the chosen route to (1) reserve the same or sufficient amount of medium access slots (MAS) for relaying a frame (packet) to avoid frame dropping; and (2) to choose the MAS in such a way to minimize additional delay introduced by multi-hop transmission.

Accordingly, as described below, a new reservation protocol (referred to herein as "Mesh DRP") is provided to address these two problems. An objective of Mesh DRP is to enable an end-to-end medium time reservation along the chosen route. To achieve this, the following features are provided.

FIG. 2 shows one embodiment of a Mesh DRP information element (IE) 200 that may be included in a frame (e.g., beacon) that is broadcast by a device in the wireless communication network 100. The IE 200 is divided into several fields, including an Element ID field, a Length field, a DRP Control field, and a Target/Owner DevAddr field. Since multiple nodes or devices along the chosen route are involved in the multi-hop reservation, the negotiation is carried out on a hop-by-hop basis. Given that the involved device is not necessary a source or destination device (unless it is on the first or last hop along the route), two fields, called Source DevAddr and Destination DevAddr, are also included to the Mesh DRP IE. As shown in FIG. 2, the Source DevAddr is the DevAddr of the source device that initiates the mesh reservation. While the Destination DevAddr is the DevAddr of the destination device to which the frames (data packets) are destined. Finally, IE 200 includes 1 to n fields, each for DRP Allocation i.

In one embodiment, the reservation negotiation process for a multi-hop transmission between a source device and a destination device is carried out as follows. First, the source device (e.g., device 110A in FIG. 1) reserves the required medium access slots (MAS) between itself and its next-hop device (i.e., a second device). In the example shown in FIG. 1, device 110A's next-hop device will be device 110B. If the proposed MAS are available at this second device 110B, then second device 110B will send a reply to the source device 110A including the received Mesh DPR IE with the Target/Owner DevAddr set to the source device 110A, and with the Reason Code set to "Pending." Otherwise, the second device will send a reply to the source device 110A including a Mesh DRP IE with an appropriate reason code, indicating that the reservation request of source device 110A is denied. In the former case, second device 110B will also initiate a new reservation, with the same amount of MAS and the same stream index, with its own next-hop device (i.e., a third device), which is derived based on the Destination DevAddr in the received Mesh DRP IE. In the example shown in FIG. 1, device 110B's next-hop device will be device 110C. If the proposed MAS are available at third device 110C, then it will react in the same as second device 110B, as described above. Whenever the reason code is anything but "Pending", the neighbors of third device 110C (e.g., device 110B) on the route should update the reason code in its existing Mesh DRP IE—specified by (Source DevAddr, Destination DevAddr and stream index)—accordingly. This behavior is recursive in the sense that the neighbors, neighbors' neighbors and so on will follow the same procedure. When the destination device (e.g. destination device 110D) receives the Mesh DRP IE and accepts the reservation initiated by its neighbor (e.g., third device 110C), then the reason code is set to "Accepted". In the next several superframes, all other devices 100 on the route (devices 110C and 110B) will then change the reason code from "Pending" to "Accepted". Only when source device 110A receives a Mesh DRP IE with reason code set to "Accepted" can the transmission of data from source device 110A to destination device 110D begin.

Figure 3:
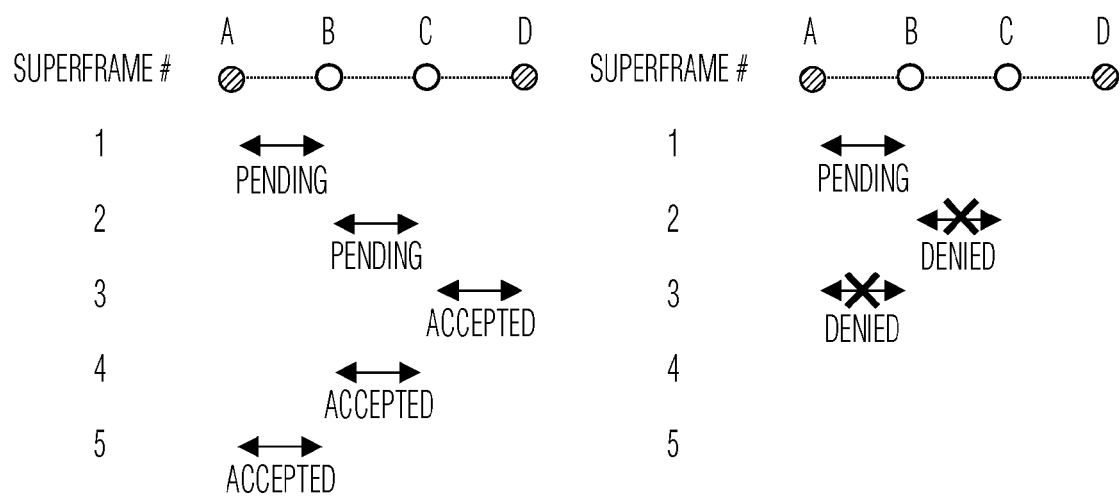
FIG. 3 illustrates some examples of end-to-end multi-hop reservation negotiation in mesh wireless network.

FIG. 3 illustrates some examples of the proposed end-to-end multi-hop reservation negotiation.

Figure 4:
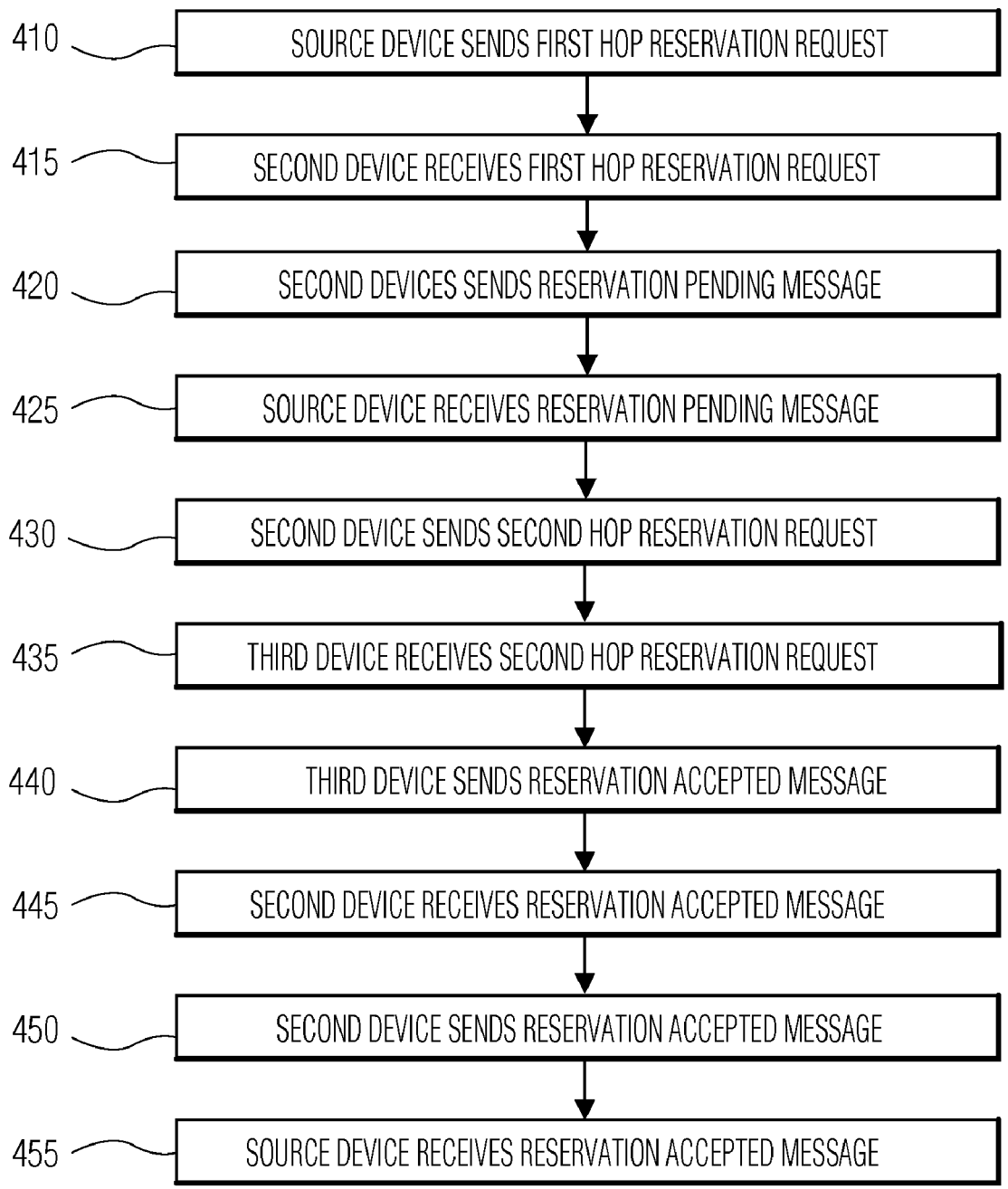
FIG. 4 is a flowchart illustrating a method of reserving X slots for transmitting data from a source device to a destination device via multi-hop relay.

FIG. 4 is a flowchart illustrating a method of reserving X slots for transmitting data from a source device to a destination device via multi-hop relay. In the example of FIG. 4, for simplicity sake, it is assumed that the third device is the destination device, but of course there may be any number of relay devices between the source device and the destination device.

In a first step 410, the source device sends a first hop reservation request, addressed to a second device different from the destination device, for transmitting data from the source device to the destination device. The first hop reservation request identifies the source device, the destination device, and X proposed slots to be reserved for a first hop between the source device and the second device.

In a step 415, the second device receives the first hop reservation request.

In a step 420, the second device sends a first message, addressed to the source device, indicating that the first hop reservation request is pending and that the X slots proposed by the source device have been reserved by the second device.

In a step 425, the source device receives the first message, addressed to the source device from the second device, indicating that the first hop reservation request is pending and that the X slots proposed by the source device have been reserved by the second device.

In a step 430, the second device sends a second hop reservation request, addressed to a third device, for transmitting the data from the source device to the destination device. The second hop reservation request identifies the source device, the destination device, and X proposed slots to be reserved for a second hop between the second device and the third device. Beneficially, the X slots proposed by the second device for the second hop are different from the X slots proposed by the source device for the first hop. As will be explained in further detail below, beneficially the second device selects for the second hop the first available X slots in the superframe after the X slots proposed by the source device for the first hop.

In a step 435, the third device receives the second hop reservation request from the second device.

In a step 440, the third device (i.e., the destination device) sends a second message, addressed to the second device, indicating that the second hop reservation request is accepted and that the X slots proposed by the second device have been reserved by the third device. If the third device was not the destination device, then instead the second message would only indicate that the second hop reservation request is pending and that the X slots proposed by the second device have been reserved by the third device. In that case, the third device would send its own reservation request to the next device, which would be repeated until the destination device was reached or a reservation request in the chain was denied for any reason.

In a step 445, the second device receives the second message, addressed to the second device from the third device, indicating that the second hop reservation request is accepted and that the X slots proposed by the second device have been reserved by the third device.

In that case, in a step 450, the second device sends a subsequent message, addressed to the source device, indicating that a final hop reservation request has been accepted by the destination device, corresponding to the first hop reservation request of the source device.

Then in a step 455, the source device receives the subsequent message, addressed to the source device from the second device, indicating that the final hop reservation request has been accepted by the destination device, corresponding to the first hop reservation request of the source device.

At that point, the multi-hop reservation is confirmed and the source device may begin transmitting data for the destination device using the X MAS it originally confirmed for the first hop to the second device.

In general, there may be M devices between the source device and the destination device in a multi-hop relay. Each of those M devices participates in establishing the reservations for the multi-hop relay as follows.

Consider an Nth device, in the multi-hop relay, where $2 \leq N \leq M$.

Figure 5:
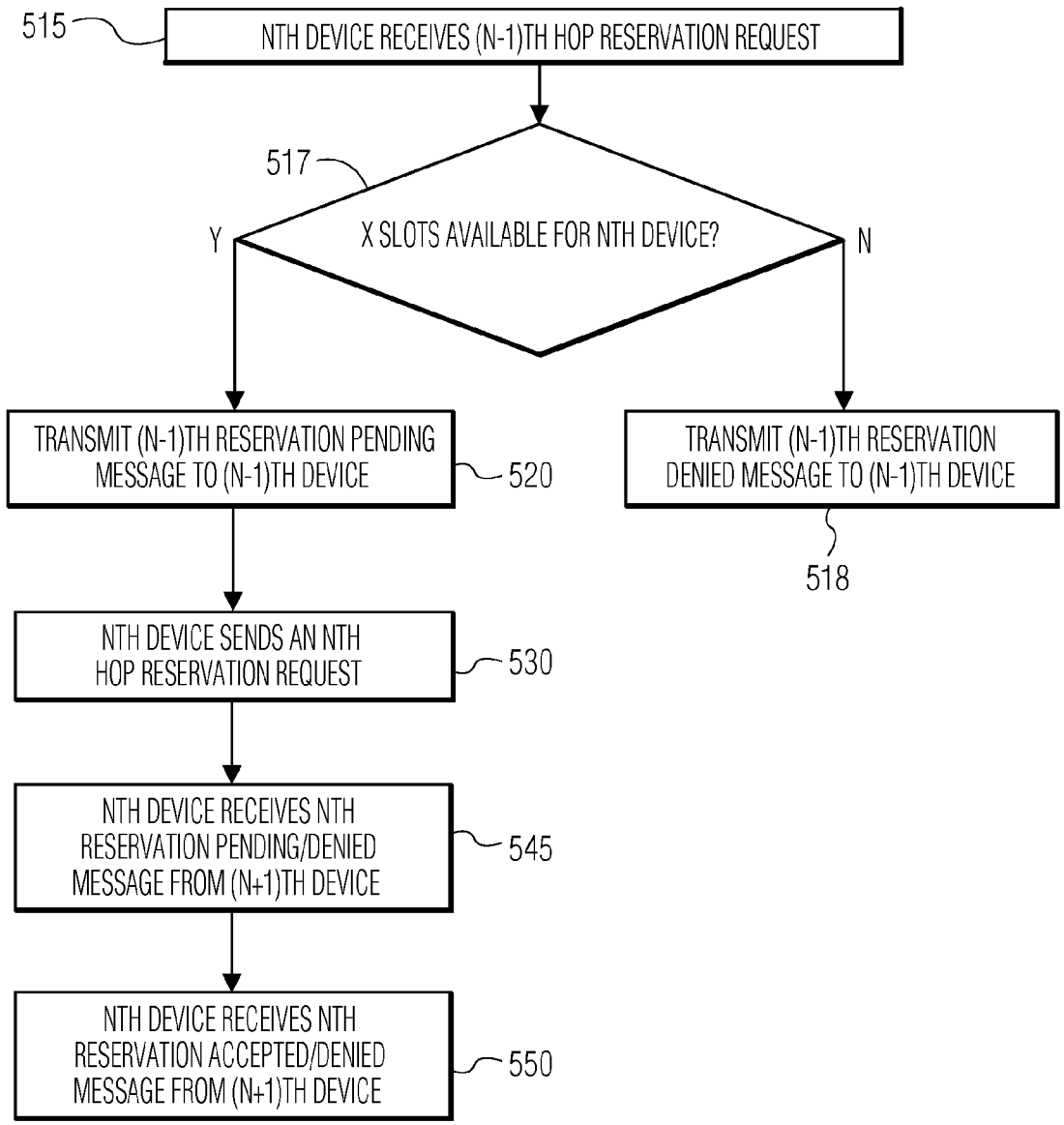
FIG. 5 illustrates steps performed by an Nth device, in the multi-hop relay having a total of M devices, where $2 \leq N \leq M$.

In that case, as illustrated in FIG. 5, in a step 515 the Nth device receives an (N−1)th hop reservation request for transmitting data from the source device to the destination device via multi-hop relay. The reservation request identifies the source device, the destination device, and X proposed slots (e.g., MAS) to be reserved for an (N−1)th hop between an (N−1)th device and the Nth device. In response to the (N−1)th hop reservation request, in a step 517 the Nth device determines whether the X slots proposed to be reserved for the (N−1)th hop between an (N−1)th device and the Nth device are available to the Nth device.

When the X proposed slots to be reserved for the (N−1)th hop are available at the Nth device, then in a step 520 the Nth device transmits an (N−1)th message from the Nth device, addressed to the (N−1)th device, indicating that the reservation request is pending and that the X slots proposed by the (N−1)th device have been reserved by the Nth device. Then, in a step 530, the Nth device sends an Nth hop reservation request, addressed to an (N+1)th device, for transmitting the data from the source device to the destination device. The Nth hop reservation request identifies the source device, the destination device, and X proposed slots to be reserved for an Nth hop between the Nth device and the (N+1)th device. The X slots proposed by the Nth device to be reserved for the Nth hop are different from the X slots proposed by an (N−1)th device to be reserved for the (N−1)th hop. As will be explained in further detail below, beneficially the Nth device selects for the Nth hop the first available X slots in the superframe, after the X slots proposed by an (N−1)th device for the (N−1)th hop. Subsequently, in a step 545, the Nth device receives an Nth message, addressed to the Nth device from the (N+1)th device, indicating whether the reservation request is pending, or whether it has been denied. In the case where the Nth device receives a message indicating that the reservation request is pending, then later, in a step 550, the Nth device receives a subsequent message indicating whether or not the reservation request has been accepted by the destination device, or whether it has been denied by any one of the downstream devices (including the destination device).

Meanwhile, in a step 518, when the X slots proposed to be reserved for the (N−1)th hop are not available at the Nth device, then the Nth device transmits an (N−1)th message, addressed to the (N−1)th device, indicating that the reservation request is denied.

Although the multi-hop negotiation described above ensures that a sufficient amount of MAS are reserved along the chosen route, a frame (packet) may experience a longer delay than in the single-hop case. In general, the frames received from the neighbor in the current superframe are usually relayed/forwarded to the next-hop device in the next superframe. Therefore, the worst case of the frame delay, given no transmission error, is proportional to the number of hops on the chosen route. For delay-sensitive traffic, this may be unacceptable.

To minimize the delay incurred by the mesh transmission, beneficially, allocation of MAS by devices along the route is coordinated to some extent. Here, we assume each mesh transmission is unidirectional, namely starting from the source device and ending at the destination device. A device that is one-hop closer to the source device is considered as an upstream device from the perspective of a device that is one hop more away from the source device. When a device in the chain receives a Mesh DRP IE from its upstream device, it will check the allocation of MAS identified by that Mesh DRP IE (e.g., X MAS). If X MAS are available for downstream reservation by the device, then the device will, if possible, reserve the next available X MAS that are located after the X MAS reserved by its immediate upstream device. In this way, a device can relay/forward a frame (packet) received from its upstream device to its downstream device within the same superframe. If the device does not have X MAS available in the superframe after the X MAS reserved by its immediate upstream device, then it will reserve the first available X MAS that it can find in the superframe This process is repeated for all devices in the multi-hop link. In this way, the frame (packet) is passed from the source device to the destination device with a minimized delay.

Figure 6A:
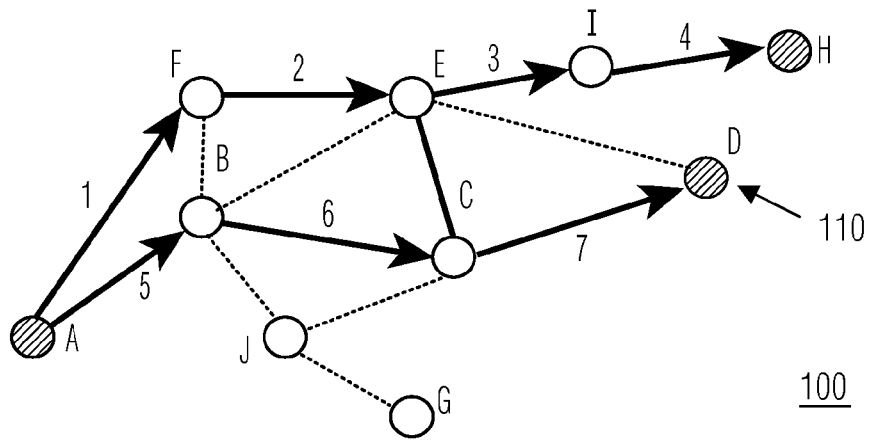
FIG. 6 illustrates some examples of coordinated MAS allocations for multi-hop transmission using superframes.
Figure 6B:
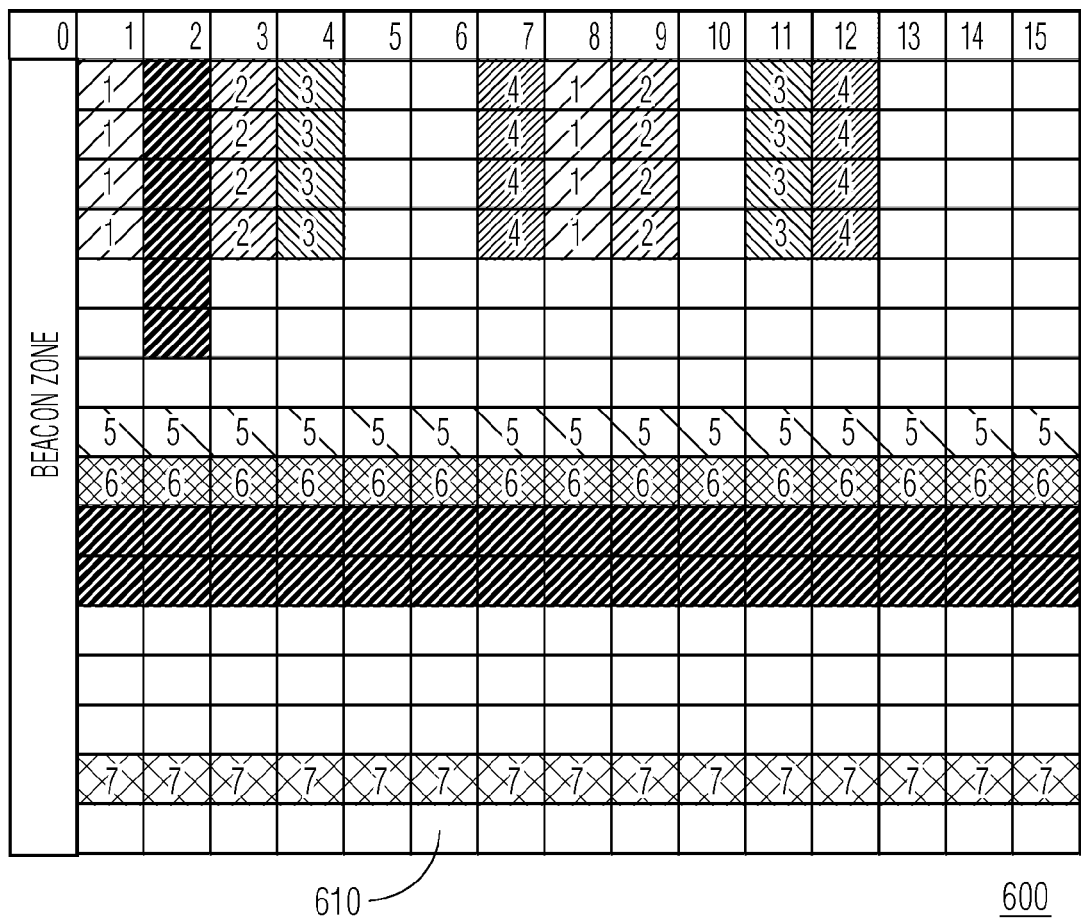

FIG. 6 illustrates some examples of such coordinated MAS allocations using MAS 610 in a superframe 600.

While preferred embodiments are disclosed herein, many variations are possible which remain within the concept and scope of the invention. Such variations would become clear to one of ordinary skill in the art after inspection of the specification, drawings and claims herein. The invention therefore is not to be restricted except within the spirit and scope of the appended claims.

What is claimed is:

1. In a communication network (100) comprising a plurality of devices (110) communicating using a reservation-based data transfer protocol having a superframe (600) comprising a plurality of slots (610), a method (400) of reserving X slots (610) for transmitting data from a source device (110A) to a destination device (110D) via multi-hop relay, the method comprising:
   sending (410) a first hop reservation request from the source device (110A), addressed to a second device (110) different from the destination device (110D), for transmitting data from the source device (110A) to the destination device (110D), the first hop reservation request identifying the source device (110A), the destination device (110D), and X proposed slots (610) to be reserved for a first hop between the source device (110A) and the second device (110);
   at the source device (110A) receiving (425) a first message, addressed to the source device (110A) from the second device (110), indicating that the first hop reservation request is pending and that the X slots (610) proposed by the source device (110A) have been reserved by the second device (110); and
   at the source device (110A) receiving (455) a subsequent message, addressed to the source device (110A) from the second device (110), indicating that a final hop reservation request has been accepted by the destination device (110D), corresponding to the first hop reservation request of the source device (110A).

2. The method (400) of claim 1, further comprising:
   receiving (415) the first hop reservation request at the second device (110); and
   sending (430) a second hop reservation request from the second device (110), addressed to a third device (110), for transmitting the data from the source device (110A) to the destination device (110D), the second hop reservation request identifying the source device (110A), the destination device (110D), and X proposed slots (610) to be reserved for a second hop between the second device (110) and the third device (110), wherein the X slots (610) proposed by the second device (110) for the second hop are different from the X slots (610) proposed by the source device (110A) for the first hop.

3. The method (400) of claim 2, further comprising:
   at the second device (110) receiving a second message, addressed to the second device (110) from the third device (110), indicating that the second hop reservation request is pending and that the X slots (610) proposed by the second device (110) have been reserved by the third device (110); and
   at the second device (110) receiving (445) a subsequent message, addressed to the second device (110) from the third device (110), indicating that the final hop reservation request has been accepted by the destination device (110D).

4. The method (400) of claim 3, where the third device (110) is the destination device (110D).

5. The method (400) of claim 3, wherein the source device (110A) chooses the first X slots (610) in the superframe (600) that are available to the source device (110A) as the X slots (610) proposed by the source device (110A) to be reserved for the first hop between the source device (110A) and the second device (110).

6. The method (400) of claim 5, wherein the second device (110) chooses the first X slots (610) in the superframe (600) that are available to the second device (110), but which are located in the superframe (600) after the X slots (610) proposed by the source device (110A), as the X slots (610) proposed by the second device (110) to be reserved for the second hop between the second device (110) and the third device (110).

7. The method (400) of claim 3, further comprising:
   receiving at an Nth device (110) an (N−1)th hop reservation request for transmitting the data from the source device (110A) to the destination device (110D), the (N−1)th hop reservation request identifying the source device (110A), the destination device (110D), and X proposed slots (610) to be reserved for an (N−1)th hop between the (N−1)th device (110) and the Nth device (110);
   sending the final hop reservation request from the Nth device (110), addressed to the destination device (110D), for transmitting the data from the source device (110A) to the destination device (110D), the final hop reservation request identifying the source device (110A), the destination device (110D), and X proposed slots (610) to be reserved for a final hop between the Nth device (110) and the destination device (110D), wherein the X slots (610) proposed by the Nth device (110) to be reserved for the final hop are different from the X slots (610) proposed by the (N−1)th device (110) to be reserved for the (N−1)th hop; and
   at the Nth device (110) receiving an Nth message, addressed to the Nth device (110) from the destination device (110D), indicating that the reservation request has been accepted by the destination device (110D).

8. The method (400) of claim 7, wherein the Nth device (110) chooses the first X slots (610) in the superframe (600) that are available to the Nth device (110), but which are located in the superframe (600) after the X slots (610) proposed by the (N−1)th device (110), as the X slots (610) proposed by the Nth device (110) to be reserved for the final hop between the Nth device (110) and the destination device (110D).

9. The method (400) of claim 1, further comprising:
   (1) receiving at an Nth device (110) an (N−1)th hop reservation request for transmitting the data from the source device (110A) to the destination device (110D), the (N−1)th hop reservation request identifying the source device (110A), the destination device (110D), and X proposed slots (610) to be reserved for an (N−1)th hop between an (N−1)th device (110) and the Nth device (110)

(2) sending an Nth hop reservation request from the Nth device (110), addressed to an (N+1)th device (110), for transmitting the data from the source device (110A) to the destination device (110D), the Nth hop reservation request identifying the source device (110A), the destination device (110D), and X proposed slots (610) to be reserved for an Nth hop between the Nth device (110) and the (N+1)th device (110), wherein the X slots (610) proposed by the Nth device (110) to be reserved for the Nth hop are different from the X slots (610) proposed by an (N−1)th device (110) to be reserved for the (N−1)th hop; and (3) at the Nth device (110) receiving an Nth message, addressed to the Nth device (110) from the (N+1)th device (110), indicating that the reservation is pending and that the X slots (610) proposed by the Nth device (110) have been reserved by the (N+1)th device (110).

10. The method (400) of claim 9, wherein the Nth device (110) chooses the first X slots (610) in the superframe (600) that are available to the Nth device (110), but which are located in the superframe (600) after the X slots (610) proposed by the (N−1)th device (110), to be reserved for the Nth hop between the Nth device (110) and the (N+1)th device (110).

11. The method (400) of claim 9, wherein there are M devices (110) between the source device (110A) and the destination device (110D) in the multi-hop relay, and wherein steps (1)-(3) are repeated for each N device (110), where $2 \leq N \leq M$.

12. The method (400) of claim 11, wherein, for all N devices (110) where $2 \leq N \leq M-1$, the Nth device (110) chooses the first X slots (610) in the superframe (600) that are available to the Nth device (110), but which are located in the superframe (600) after the X slots (610) proposed by the (N−1)th device (110), as the X slots (610) proposed by the Nth device (110) to be reserved for the Nth hop between the Nth device (110) and the (N+1)th device (110).

13. The method (400) of claim 1, wherein the source device (110A) chooses the first X slots (610) in the superframe (600) that are available to the source device (110A) as the X slots (610) proposed by the source device (110A) to be reserved for the first hop between the source device (110A) and the second device (110).

14. In a communication network (100) comprising a plurality of devices (110) communicating using a reservation-based data transfer protocol having a superframe (600) comprising a plurality of slots (610), a method (500) of reserving slots (610) for transmitting data from a source device (110A) to a destination device (110D) via multi-hop relay, the method (500) comprising:

(1) receiving (515) at an Nth device (110) an (N−1)th hop reservation request for transmitting data from a source device (110A) to a destination device (110D) via multi-hop relay, the reservation request identifying the source device (110A), the destination device (110D), and X proposed slots (610) to be reserved for an (N−1)th hop between an (N−1)th device (110) and the Nth device (110);

(2) when the X proposed slots (610) to be reserved for the (N−1)th hop are available at the Nth device (110):

(2a) transmitting (520) an (N−1)th message from the Nth device (110), addressed to the (N−1)th device (110), indicating that the reservation request is pending and that the X slots (610) proposed by the (N−1)th device (110) have been reserved by the Nth device (110), and (2b) sending (530) an Nth hop reservation request from the Nth device (110), addressed to an (N+1)th device (110), for transmitting the data from the source device (110A) to the destination device (110D), the Nth hop reservation request identifying the source device (110A), the destination device (110D), and X proposed slots (610) to be reserved for an Nth hop between the Nth device (110) and the (N+1)th device (110), wherein the X slots (610) proposed by the Nth device (110) to be reserved for the Nth hop are different from the X slots (610) proposed by an (N−1)th device (110) to be reserved for the (N−1)th hop; and (3) when the X proposed slots (610) to be reserved for the (N−1)th hop are not available at the Nth device (110), transmitting (518) an (N−1)th message from the Nth device (110), addressed to the (N−1)th device (110), indicating that the reservation request is denied.

15. The method (500) of claim 14, where there are M devices (110) between the source device (110A) and the destination device (110D) in the multi-hop relay, and wherein steps (1)-(3) are repeated for each N device (110), where $2 \leq N \leq M$.

16. The method (500) of claim 15, wherein, for all N devices (110) where $2 \leq N \leq M-1$, the Nth device (110) chooses the first X slots (610) in the superframe (600) that are available to the Nth device (110), but which are located in the superframe (600) after the X slots (610) proposed by the (N−1)th device (110), to be reserved for the Nth hop between the Nth device (110) and the (N+1)th device (110).

17. The method (500) of claim 14, wherein the Nth device (110) chooses the first X slots (610) in the superframe (600) that are available to the Nth device (110), but which are located in the superframe (600) after the X slots (610) proposed by the (N−1)th device (110), to be reserved for the Nth hop between the Nth device (110) and the (N+1)th device (110).

18. The method of claim 14, further comprising, after step (2b):

(2c) receiving (545) an Nth message at the Nth device (110), addressed to the Nth device (110) from the (N+1)th device (110), indicating that the reservation request is pending and that the X slots (610) proposed by the Nth device (110) have been reserved by the (N+1)th device (110).

19. The method of claim 18, further comprising, after step (2d):

(2d) receiving (550) an Nth message at the Nth device (110), addressed to the Nth device (110) from the (N+1)th device (110), indicating that the reservation request has been accepted by the destination device (110D).

* * * * *